United States Patent
Lee (10) Patent No.: US 9,959,654 B2
(45) Date of Patent: May 1, 2018

(54) SELECTION OF ANIMATION DATA FOR A DATA-DRIVEN MODEL

(75) Inventor: Gene S. Lee, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 849 days.

(21) Appl. No.: 13/314,582

(22) Filed: Dec. 8, 2011

(65) Prior Publication Data

US 2013/0147811 A1    Jun. 13, 2013

(51) Int. Cl.
*G06T 13/00* (2011.01)
*G06T 13/40* (2011.01)

(52) U.S. Cl.
CPC .................................. *G06T 13/40* (2013.01)

(58) Field of Classification Search
CPC ................................. G06T 13/00; G06T 13/40
USPC .......................................................... 345/473
See application file for complete search history.

(56) References Cited

PUBLICATIONS

Ren, L., Patrick, A., Efros, A. A., Hodgins, J. K., & Rehg, J. M. (Jul. 2005). A data-driven approach to quantifying natural human motion. In ACM Transactions on Graphics (TOG) (vol. 24, No. 3, pp. 1090-1097). ACM. Chicago.*
Seinstra, F. J., Geusebroek, J. M., Koelma, D., Snoek, C. G., Worring, M., & Smeulders, A. W. (2007). High-performance distributed video content analysis with parallel-horus. Multimedia, IEEE, 14(4), 64-75.*
Wang, Tian-Shu, et al. "Unsupervised analysis of human gestures." Advances in Multimedia Information Processing—PCM 2001. Springer Berlin Heidelberg, 2001. 174-181.*

* cited by examiner

*Primary Examiner* — Vu Nguyen
(74) *Attorney, Agent, or Firm* — Patent Ingenuity, P.C.; Samuel K. Simpson (57) ABSTRACT

A set of animation data for an element in an animation is statistically sampled to obtain a common context. The common context is a subset of a plurality of frames of the set of animation data. Further, output of a data-driven model for the animation, which utilizes at least a subset of the common context, is compared with output of a computational model for the animation. The computational model has a first set of logic. The data-driven model has a second set of logic that has less logic than the first set of logic. In addition, an error between the computational model and the data-driven model is computed.

6 Claims, 7 Drawing Sheets

SELECTION OF ANIMATION DATA FOR A DATA-DRIVEN MODEL

BACKGROUND

1. Field

This disclosure generally relates to the field of computer graphics. More particularly, the disclosure relates to analysis of animation data.

2. General Background

Current computer graphics approaches are utilized to modify shapes of objects, characters, etc. For example, a graphics artist may wish to direct the deformation of an object so that the object simulates the movement of cloth. However, to do so is often cumbersome or difficult since many approaches are either slow or limiting for the artist to control. Instead, the artist may employ a data-driven approach, which derives its results from a set of example data. Data-driven approaches are faster and more artistically-driven since the artist is providing the example data. However, such approaches often involve utilizing a set of data that is manually provided by a user as an example set of data. That set of data may or may not be ideal in obtaining the desired result. In other words, current approaches lack adequate means for selecting the data that is more useful rather than the data that is less useful. Further, such manual approaches are often subjective and difficult to quantify.

SUMMARY

In one aspect of the disclosure, a process is provided. The process statistically samples a set of animation data for an element in an animation to obtain a common context. The common context is a subset of a plurality of frames of the set of animation data. Further, the process compares output of a data-driven model for the animation, which utilizes at least a subset of the common context, with output of a computational model for the animation. The computational model has a first set of logic. The data-driven model has a second set of logic that has less logic than the first set of logic. In addition, the process computes an error between the computational model and the data-driven model.

In yet another aspect of the disclosure, a computer program product is provided. The computer program product includes a computer useable medium having a computer readable program. The computer readable program when executed on a computer causes the computer to statistically sample of a set of animation data for an element in an animation to obtain a common context. The common context is a subset of a plurality of frames of the set of animation data. Further, the computer readable program when executed on the computer causes the computer to compare output of a data-driven model for the animation, which utilizes at least a subset of the common context, with output of a computational model for the animation. The computational model has a first set of logic. The data-driven model has a second set of logic that has less logic than the first set of logic. In addition, the computer readable program when executed on the computer causes the computer to compute an error between the computational model and the data-driven model.

In another aspect of the disclosure, a process is provided. The process statistically samples, at a server, a set of animation data for an element in an animation to obtain a common context. The common context is a subset of a plurality of frames of the set of animation data. Further, the process segments, at the server, the plurality of frames of the set of animation data into a first subset and a second subset. In addition, the process sends, from the server to a first client, a first data set corresponding to the first subset. The process also sends, from the server to a second client, a second data set corresponding to the second subset. Further, the process receives, from the first client at the server, a first error that results from a first comparison in the first data set of the first subset of output of a data-driven model for the animation, which utilizes at least a subset of the common context, with output of a computational model for the animation. The computational model has a first set of logic. The data-driven model has a second set of logic that has less logic than the first set of logic. The process also receives, from the second client at the server, a second error that results from a second comparison in the second data set of the second subset of output of the data-driven model for the animation, which utilizes at least the subset of the common context, with output of the computational model for the animation.

In yet another aspect of the disclosure, a process is provided. The process receives, at a client from a server, a data set of a common context. The common context is a subset of a plurality of frames of a set of animation data that is obtained from a statistical sampling of the set of animation data. Further, the process performs a comparison of output of a data-driven model for the animation, which utilizes at least a subset of the common context, with output of a computational model. The computational model has a first set of logic. The data-driven model has a second set of logic that has less logic than the first set of logic. Further, the process computes an error between the computational model and the data-driven model.

In another aspect of the disclosure, a system is provided. The system includes a statistical sampling module that statistically samples a set of animation data for an element in an animation to obtain a common context. The common context is a subset of a plurality of frames of the set of animation data. Further, the system includes a segmentation module that segments the plurality of frames of the set of animation data into a first subset and a second subset. In addition, the system includes a transmission module that sends the first subset to a first client and the second subset to a second client. The system also includes a reception module that (i) receives, from the first client, a first error that results from a first comparison in the first subset of output of a data-driven model for the animation, which utilizes at least a subset of the common context, with output of a computational model for the animation and (ii) receives, from the second client at the server, a second error that results from a second comparison in the second subset of output of the data-driven model for the animation, which utilizes at least the subset of the common context, with output of the computational model for the animation. The computational model has a first set of logic. The data-driven model has a second set of logic that has less logic than the first set of logic.

In yet another aspect of the disclosure, a system is provided. The system includes a reception module that receives, at a client from a server, a data set of a common context. The common context is a subset of a plurality of frames of a set of animation data that is obtained from a statistical sampling of the set of animation data. Further, the system includes a comparison module that compares output of a data-driven model for the animation, which utilizes at least a subset of the common context, with output of a computational model for the animation. The computational model has a first set of logic. The data-driven model has a second set of logic that has less logic than the first set of logic. In addition, the system includes a processor that computes an error between the computational model and the data-driven model.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

An animation is a display of a sequence of frames that provides a depiction of a character, shape, object, etc. As an example, a computer may perform an animation of a sequence of frames to generate a video. Even with utilization of a computer, an animation of every frame stored by the computer or in another computer readable medium is often slow, which requires significant processing time and logic. Accordingly, a data-driven model may be utilized to apply sample frames from the full set of animation frames. The animation may then be performed with the data-driven model based on sampled frames rather than the full set of the animation frames.

In one aspect, an automated process may be utilized with hardware and software to select data for the data-driven model. In one aspect, a statistical sampling approach is utilized to select data with a margin of error that is below a predetermined threshold. The statistical sampling is utilized to sample a data set against an animation. In other words, a data set is not just randomly selected. Statistical probabilities are utilized to iterate to a proper solution. The set of data determined by the statistical sampling is then provided to the data-driven model that is utilized to generate the animation. As an example, the data model may be a data-driven model, which utilizes the data set to simulate processes of greater complexity. A data-driven model is a model that utilizes a set of sample inputs and/or outputs to help determine how to generate a general set of outputs. By utilizing a data-driven model for the animation, results may be obtained in a less computationally intensive manner than a full processing approach that would involve more time and resources. The automated process utilizes the statistical sampling to select the data that is more useful rather than the data that is less useful.

In one aspect, the statistical sampling is performed to find data that successfully allows a model, e.g., a data-driven model, to approximate a model of greater complexity when the model operates within the constraints of a common context. A common context is a subset of frames that may include common poses, gestures, or configurations. Common poses, gestures, or configurations may occur frequently and not change over a period of time. For instance, an animated character usually walks more often than jumps wildly. In this example, the jumping motion is not part of the common context. However, in other scenes that involve a large amount of jumping motions and only a momentary walk, the walk would not be part of the common context. The common context is scene driven rather than being driven by explicit actions.

Figure 1:
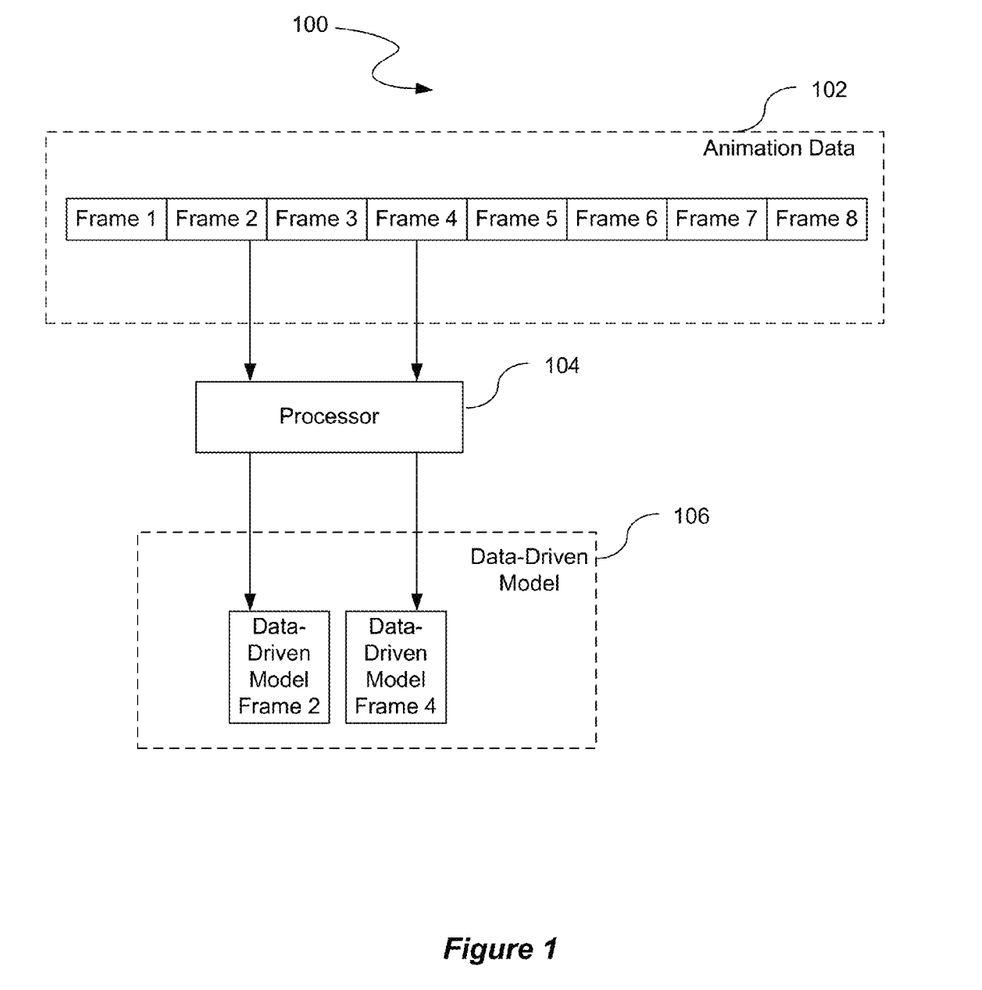
FIG. 1 illustrates a statistical sampling configuration that may be utilized to select a common context from a set of animation data.

FIG. 1 illustrates a statistical sampling configuration 100 that may be utilized to select a common context from a set of animation data. As an example, a set of animation data 102 may include eight frames. The example is utilized for illustration purposes as an animation may have a much larger number of frames. A statistical sampling approach is utilized to sample a subset of the set of animation data 102. In one aspect, the statistical sampling is performed by a processor 104. As an example, the second frame and the fourth frame may be selected from the set of animation data as the subset. The subset may then be provided by the processor 104 to a data-driven model 106. In one aspect, the statistical sampling configuration randomly samples animation data to ascertain the common context from the animation data. By focusing on common contexts, this approach ensures that poses, motions, or gestures with the highest frequencies have low error and the margin of error of the animation model is reliably low.

Figure 2:
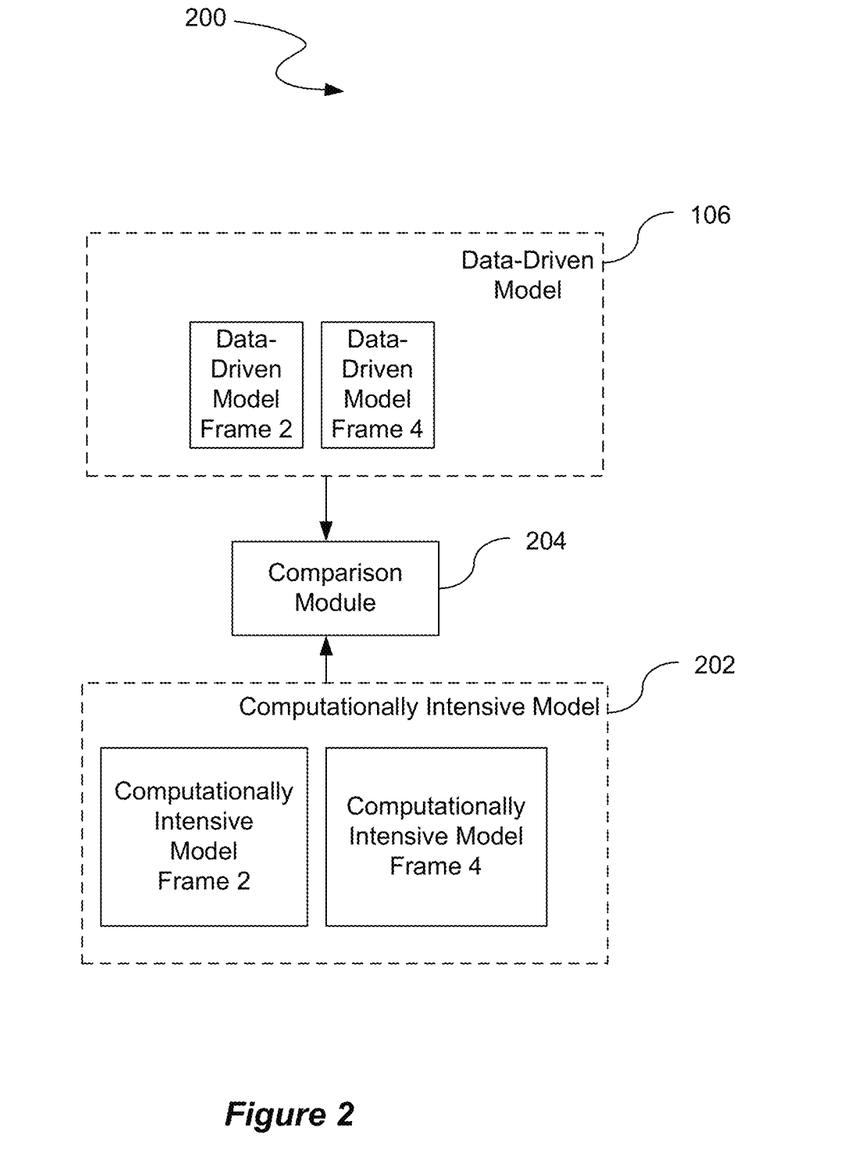
FIG. 2 illustrates a comparison configuration.

After the data for the common context is selected for the data-driven model 106 in FIG. 1, the data-driven model 106 may utilize that sampled data for an animation. An additional analysis may be performed to ensure that the data selected for the data-driven model 106 is within a margin of error. FIG. 2 illustrates a comparison configuration 200. In one aspect, the comparison configuration 200 compares the data-driven model 106 with a computationally intensive model 202 as a benchmark. In other words, models other than the data-driven model 106 may be utilized to approximate an animation. Although such models are less computationally intensive than a full processing of the animation without any model at all, such models are still too computationally intensive. Accordingly, by comparing the data-driven model 106 with the computationally intensive model 202, a benchmark margin of error for the data-driven model 106 may be established without having to perform a full processing of the animation. The outputs of these models are compared at a particular frame. For example, an element of a plurality of computationally intensive model frames 202 that correspond to the plurality of sample frames 104 illustrated in FIG. 1 may be compared by a comparison module 204. The comparison module 204 puts all the sampled fames into each model of FIG. 2. Accordingly, the comparison is performed between the computationally intensive model 202 with the output created from the data-driven model, which applies all the sampled data to create an output for each frame. The comparison module 204 determines if the comparison for an accumulated quantity of frames is within a margin of error. If the accumulated error is large, then the data given to the data-driven model 106 is not adequate. As a result, a particular data-driven model 106 may be utilized to perform an animation that is simulated based upon a relatively small number of frames. In another aspect, a ranking may be performed on a per frame basis by determining what percentage of the frame passes a minimum error test.

This automated approach finds the most ideal or nearly ideal data set for the data-driven model 106 from a set of data that is possibly suitable for the animation. Although the ideal data set is not necessarily guaranteed to be found, the utilization of statistical sampling helps find a data set that is ideal or is nearly ideal assuming that enough iterations are performed. This method is fast and easy to implement, especially if the number of frame candidates is reasonable. Frames are selected in common contexts as a group to reduce error rather than individually selecting them to simply cover poses.

The automated frame extraction process repeatedly performs quantitative analysis on whole sequences of animation. The frames that are compared may be frames of an element in a scene such as a character's clothing to a model that closely approximates it. The comparison is performed on an element in a frame, which is created with a computationally intensive model. As an example, the model may be a deformation model. The analysis computes an error per frame between the original element and the model. In one aspect, the resulting errors are ranked to determine the frame of highest error either in a single frame or an entire sequence of animation.

Figure 3:
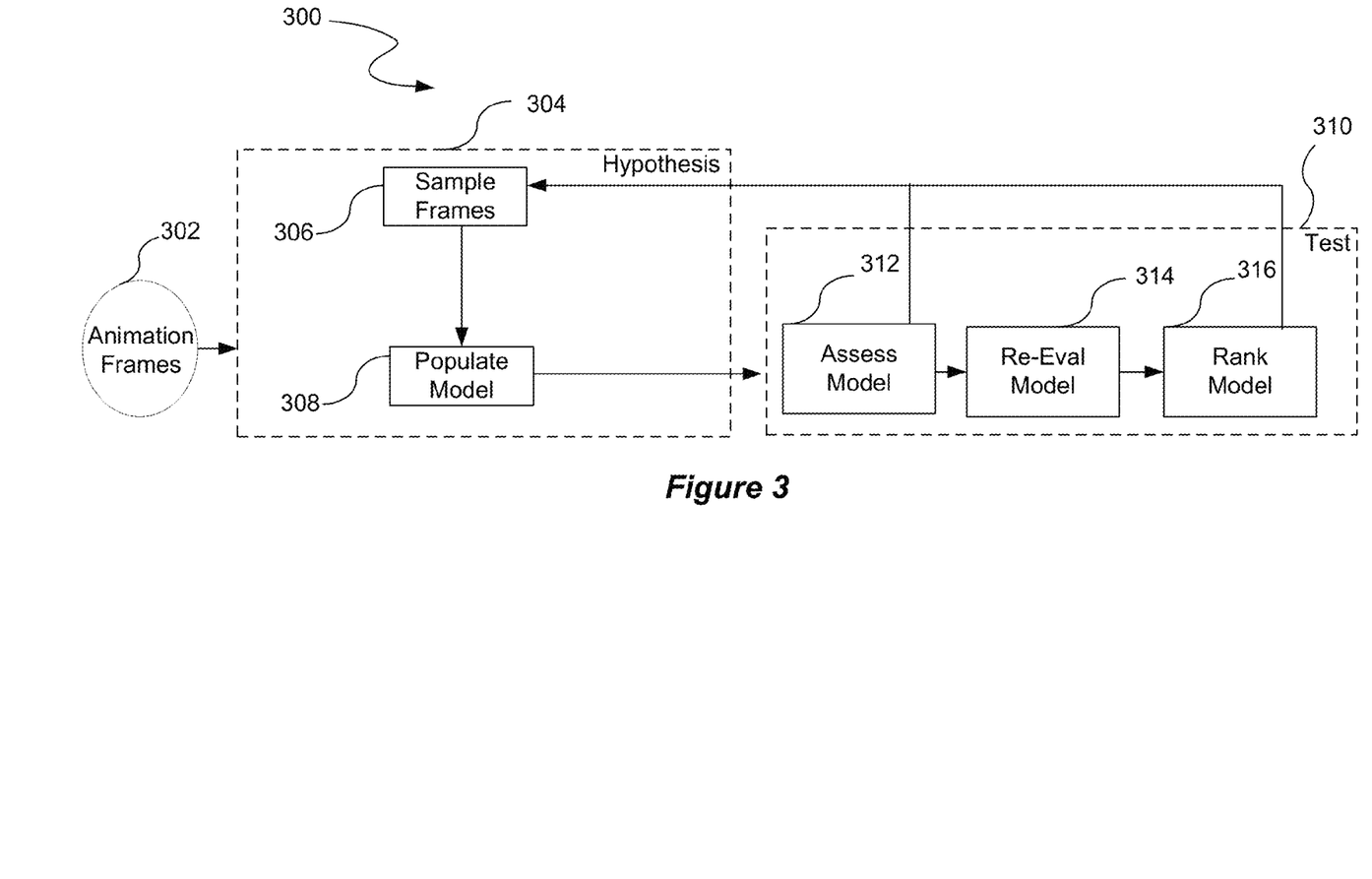
FIG. 3 illustrates a workflow that may be utilized to select a subset of frames by repeatedly examining the frames of an animation for a valid common context and finding a model that most optimally fits that common context.

FIG. 3 illustrates a workflow 300 that may be utilized to select frames by repeatedly examining a set of frames for a valid set of common contexts and finding a model that most optimally fits the valid set of common contexts. The workflow 300 includes a set of frames 302. Further, the workflow 300 includes a hypothesis phase 304 and a test phase 310. During the hypothesis phase 304, a set of sample frames is statistically sampled from a set of frames 302 at a sample frames block 306. As an example, the set of sample frames may be a relatively small set of frames that is sampled from a large set of frames. In one aspect, the set of sample frames may be randomly selected from the set of frames 302. Further, at a populate model block 308, a model is populated with data to approximate the samples of the hypothesis phase 304. The model may be an existing model that is populated with data. In another aspect, randomness may be applied to the parameters to the model to create the model. During the test phase 310, an assess model block 312 assesses the quality of the model from the previous phase. In one configuration for determining if the model qualified as high quality, the model qualifies as high quality if it approximates at least a predetermined quantity of the remaining frames, which if extracted from an animation sequence, are the frames that were not selected during the hypothesis phase. Other configurations for determining if the model qualified as high quality are possible. The minimum number of frames that must be approximated is a user-defined parameter, which is reasonably set as a percentage of the total number of available frames. The frames approximated by a high quality model define a common context for the next stage. From a statistical perspective, the frames of the common context are the inliers of the data set while the poor frames are the outliers. The poor frames appear when the object being modeled by the data-driven deformation is performing in an irregular or unusual gesture, motion, or pose over time. When the model is a poor approximation, the phase terminates, and the process repeats.

At the next stage, the re-eval model block 314 reevaluates the model to approximate the inliers. At the next stage, the rank model block 316 ranks the model that has been created by computing the margin of error for each inlier, e.g., common context, and then summing the results. The highest ranking model of all iterations provides the frames that are at least nearly optimal for approximating the common context.

Figure 4:
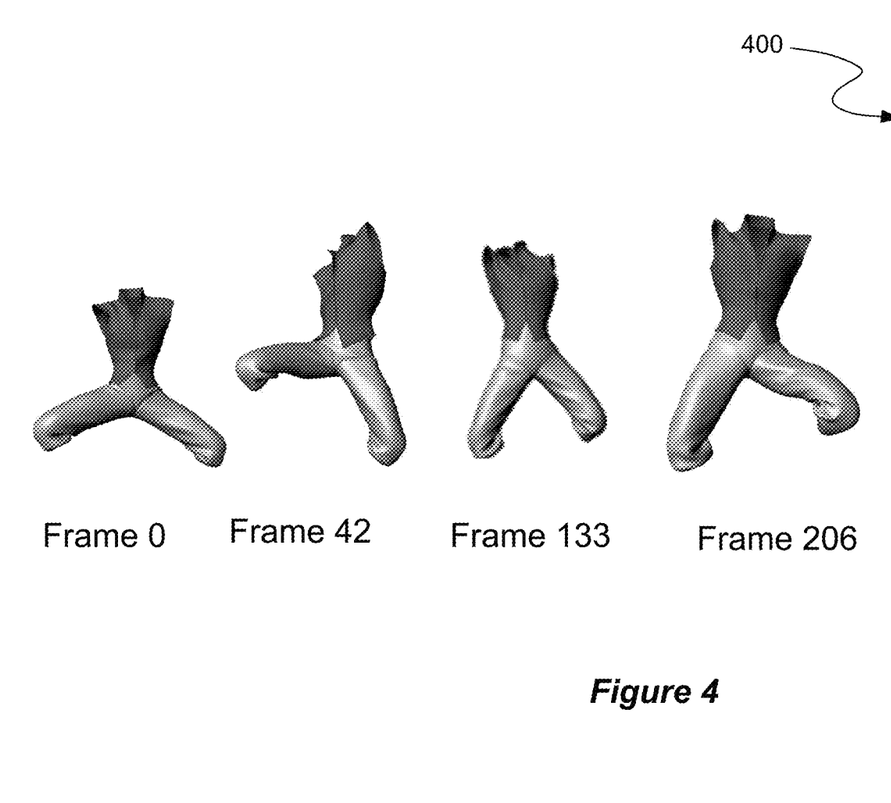
FIG. 4 illustrates a plurality of sample frames that are selected as a result of the automated distributed analysis system.

FIG. 4 illustrates a plurality of sample frames that are selected as a result of the automated distributed analysis system. For example, a character may be climbing a wall for two hundred seven frames while pausing temporarily between frames one hundred to one hundred fifty. The data selection process may be performed for the element of the pants. In this instance, the common context is the pants moving constantly. Accordingly, frames for the pants may be sampled. For instance, frames zero and forty two illustrates the character performing a constant climbing motion. Frame one hundred thirty three illustrates the character performing a different motion other than climbing. Further, at frame two hundred six, the character is performing another climbing motion. The statistical sampling approach has selected these frames for the common context of the pants performing a climbing motion. These frames are then provided to a data model as data that is at least nearly optimal.

Figure 5:
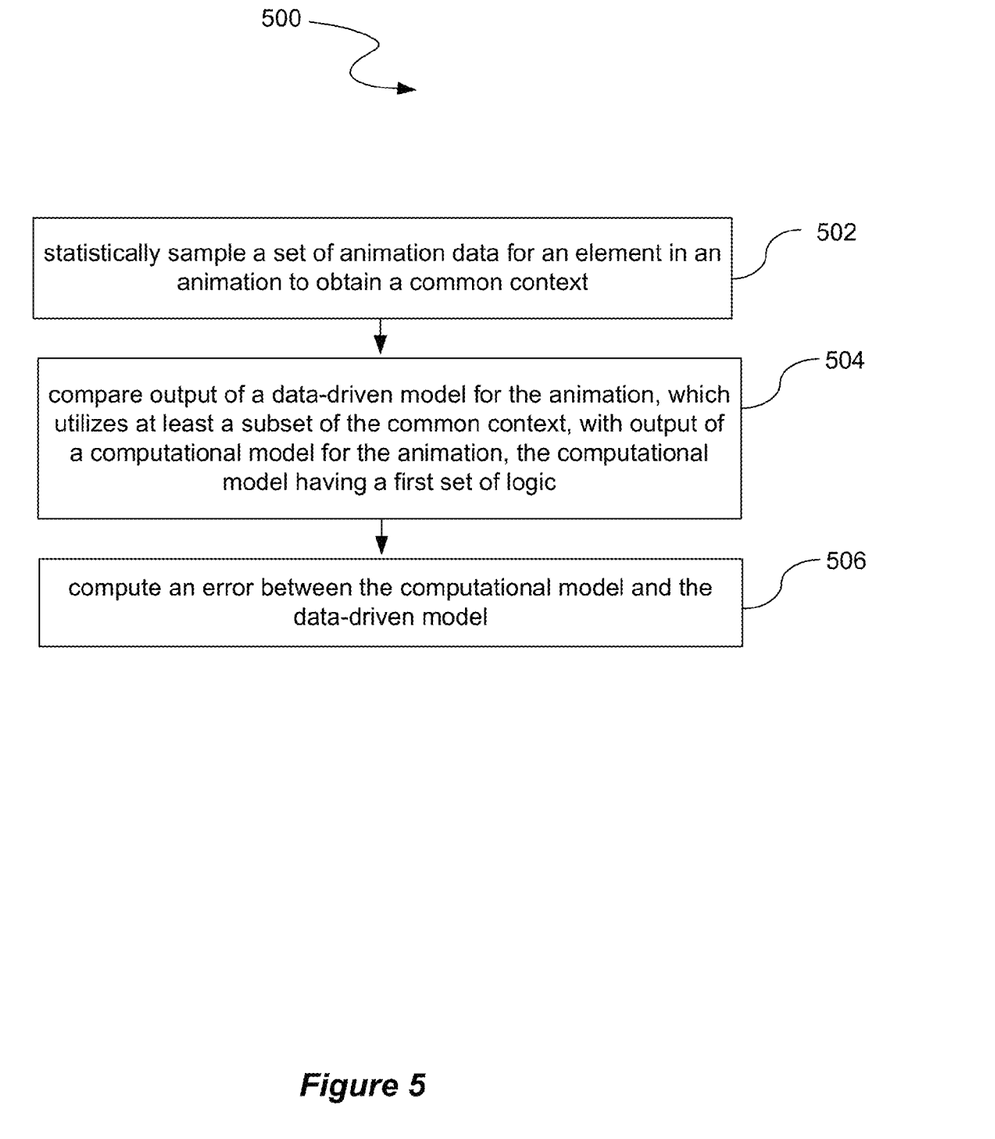
FIG. 5 illustrates a process that may be utilized to select a common context for an animation model.

FIG. 5 illustrates a process 500 that may be utilized to select a common context for an animation model. At a process block 502, the process 500 statistically samples a set of animation data for an element in an animation to obtain a common context. The common context is a subset of a plurality of frames of the set of animation data. Further, at a process block 504, the process 500 compares output of a data-driven model for the animation, which utilizes at least a subset of the common context, with output of a computational model for the animation. The computational model has a first set of logic. Further, the data-driven model has a second set of logic that has less logic than the first set of logic. The term logic is intended herein to mean algorithms, code, instructions, or the like. Accordingly, the data-driven model may utilize one or more algorithms that have less time and/or space complexity. In addition, the process 500 computes an error between the computational model and the data-driven model in block 506.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

Figure 6:
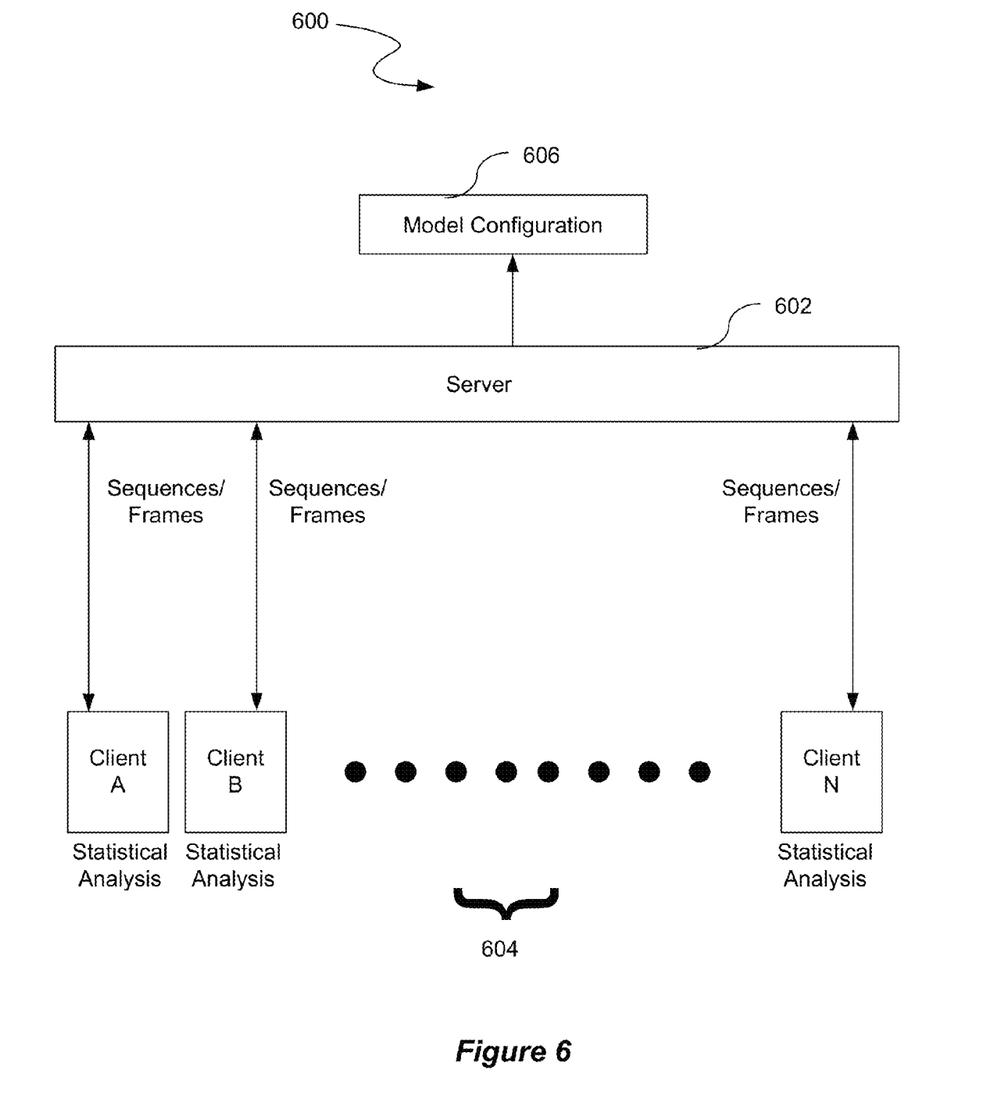
FIG. 6 illustrates a system configuration that utilized distributed processing to perform the automatic extraction process described herein.

FIG. 6 illustrates a system configuration 600 that utilized distributed processing to perform the automatic extraction process described herein. A server 602 (such as a server computer) may segment a plurality of animation frames into a plurality of subsets and spread those subsets across multiple clients 604 (such as client computers) for analysis. In one aspect, the server 602 sends data corresponding to the frames of the subsets to the clients 604 so that the clients 604 may obtain the frames to examine. In yet another aspect, the server 602 sends the frames themselves to the clients 604. The clients 604 may repeatedly search for frames of high error from multiple sequences of animation. The clients 604 send those results to the server 602, which may aggregate those results and send the frames to a model configuration 606. As an example, the model configuration 606 may be a data-driven configuration that utilizes a data-driven approach to provide an animation.

A client may send the error value for the frame with the highest error or possibly all of the errors for every frame. The type of error values received depends on how the client performs a ranking of the sampled data set. In yet another aspect, the automated process described herein may be utilized to seek other statistical properties such as those based on temporal characteristics, e.g., frequency, commonality, and duration of poses, wrinkles, etc. and those based on physical properties, e.g., location and magnitude of poses, wrinkles, etc. These properties may help provide better and faster approximation models, e.g., data-driven models.

Figure 7:
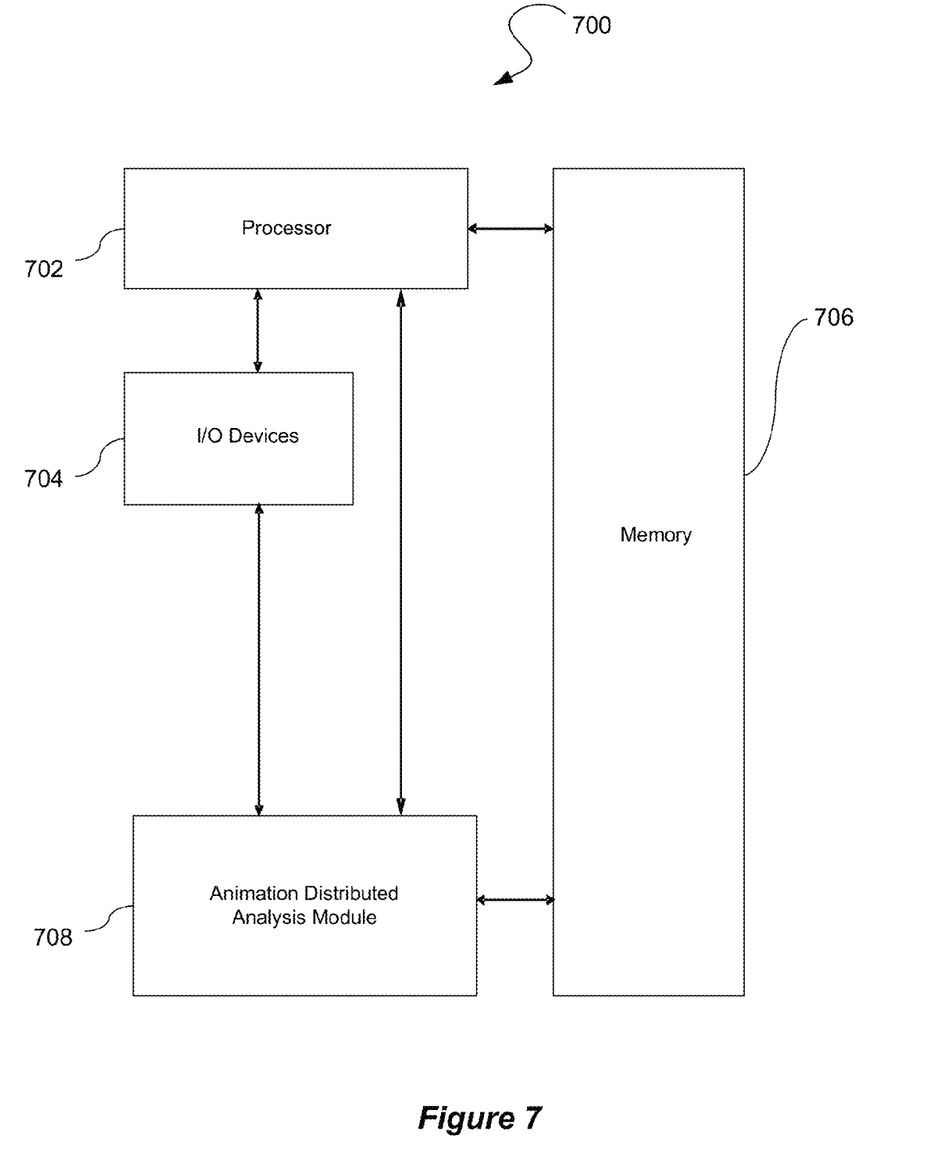
FIG. 7 illustrates a block diagram of a station or system that provides distributed analysis of animation data.

FIG. 7 illustrates a block diagram of a station or system 700 that provides distributed analysis of animation data. In one aspect, the station or system 700 is implemented utilizing a general purpose computer or any other hardware equivalents. Thus, the station or system 700 comprises a processor 702, a memory 706, e.g., random access memory ("RAM") and/or read only memory (ROM), an animation distributed analysis module 708 that performs distributed analysis of animation data, and various input/output devices 704, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the animation distributed analysis module 708 may be implemented as one or more physical devices that are coupled to the processor 702. For example, the animation distributed analysis module 708 may include a plurality of modules. Alternatively, the animation distributed analysis module 708 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor in the memory 706 of the computer. As such, the animation distributed analysis module 708 (including associated data structures) of the present disclosure may be stored on a computer readable medium, e.g., RAM memory, magnetic or optical drive or diskette and the like.

The station or system 700 may be utilized to implement any of the configurations herein. In another aspect, the processor 702 is the animation distributed analysis module 708. Accordingly, in such an aspect, an animation distributed analysis module 708 that is separate from the processor 702 is unnecessary. FIG. 7 provides an example of an implementation of an animation distributed analysis system. However, the animation distributed analysis system is not limited to any particular model and may be implemented with similar components of FIG. 7 to perform other types of animation.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. A method comprising:

statistically sampling, at a server, a set of animation data for an element in an animation to obtain a common context, the common context being a subset of a plurality of frames of the set of animation data;

segmenting, at the server, the plurality of frames of the set of animation data into a first subset and a second subset;

sending, from the server to a first client, a first data set corresponding to the first subset;

sending, from the server to a second client, a second data set corresponding to the second subset;

receiving, from the first client at the server, a first error that results from a first comparison in the first data set of the first subset of output of a data-driven model for the animation, which utilizes at least a subset of the common context, with output of a computational model for the animation, the computational model having a first set of logic, the data-driven model having a second set of logic that has less logic than the first set of logic; and receiving, from the second client at the server, a second error that results from a second comparison in the second data set of the second subset of output of the data-driven model for the animation, which utilizes at least the subset of the common context, with output of the computational model for the animation.

2. The method of claim 1, further comprising aggregating, at the server, the first error and the second error to form an aggregated set of errors.

3. The method of claim 1, wherein the common context includes a frame with a gesture.

4. The method of claim 1, wherein the common context includes a frame with a configuration.

5. The method of claim 1, wherein the common context includes a frame with a pose.

6. A system comprising:

a statistical sampling module that statistically samples a set of animation data for an element in an animation to obtain a common context, the common context being a subset of a plurality of frames of the set of animation data;

a segmentation module that segments the plurality of frames of the set of animation data into a first subset and a second subset;

a transmission module that sends the first subset to a first client and the second subset to a second client; and a reception module that (i) receives, from the first client, a first error that results from a first comparison in the first subset of output of a data-driven model for the animation, which utilizes at least a subset of the common context, with output of a computational model for the animation and (ii) receives, from the second client at the server, a second error that results from a second comparison in the second subset of output of the data-driven model for the animation, which utilizes at least the subset of the common context, with output of the computational model for the animation, the computational model having a first set of logic, the data-driven model having a second set of logic that has less logic than the first set of logic.

* * * * *